United States Patent [19]

Janisch

[11] Patent Number: 4,622,935
[45] Date of Patent: Nov. 18, 1986

[54] LOW LEVEL LUBRICATING OIL DETECTOR

[75] Inventor: Douglas G. Janisch, Mequon, Wis.

[73] Assignee: Briggs & Stratton Corp., Wauwatosa, Wis.

[21] Appl. No.: 797,514

[22] Filed: Nov. 13, 1985

[51] Int. Cl.⁴ .................................................. F02B 77/00
[52] U.S. Cl. .......................... 123/198 DC; 123/196 R; 123/196 S; 184/6.4
[58] Field of Search ........ 123/196 S, 196 R, 198 DC, 123/198 D; 184/6.4, 108

[56] References Cited

U.S. PATENT DOCUMENTS

| | | | |
|---|---|---|---|
| 3,366,100 | 1/1968 | Sapp | 123/198 DC |
| 3,385,109 | 5/1968 | Crane | 123/196 R |
| 3,983,958 | 10/1976 | Swearingen | 184/108 |
| 4,203,408 | 5/1980 | Yamaguchi | 123/198 DC |
| 4,256,069 | 3/1981 | Masuda | 123/196 R |
| 4,480,610 | 11/1984 | Stinson | 184/6.4 |

Primary Examiner—E. Rollins Cross
Attorney, Agent, or Firm—Andrus, Sceales, Starke & Sawall

[57] ABSTRACT

A low level lubricating oil detector for an internal combustion engine. The detector includes a tube that is located in crankcase of the engine and the tube has an opening in its lower end located at the predetermined minimum oil level. The upper end of the tube communicates with a chamber and one side of the chamber is enclosed by a piezo electric element. When the oil level in the crankcase recedes beneath the minimum level, pressure pulsations in the crankcase are transmitted through the tube to the piezo electric element which generates a signal that operates through an electric circuit to stop operation of the engine.

10 Claims, 3 Drawing Figures

LOW LEVEL LUBRICATING OIL DETECTOR

BACKGROUND OF THE INVENTION

Operators of small internal combustion engines, such as one and two cycle, four stroke engines, often fail to adequately maintain the necessary level of lubricating oil in the crankcase resulting in failure of the engine. It is therefore desirable to have a protective system built into the engine which will either shut down operation of the engine, or operate a visual or audio signal should the oil level fall to a dangerously low level.

With a splash lubricated engine, an automotive-type oil pressure switch cannot be utilized. In the past, various types of mechanical systems have been proposed for use with splash lubrication systems to detect a dangerously low lubricating oil level. The detecting mechanisms, as used in the past have, for example, included float switches, capacitor switches, and thermal switches. Float switches are rather large and difficult to adapt to existing equipment and due to the substantial number of moving parts are not completely failsafe. Capacitance and thermal switches generally are quite costly and require an external power supply for operation.

More recently, low level lubricating oil detectors, which operate on pressure pulsations produced by the engine, have been proposed, as disclosed in U.S. Pat. No. 4,203,408. With this type of system, an oil detecting tube extends into the crankcase of the engine and has an opening which is located at the predetermind minimum oil level. The outer end of the tube is connected to an external chamber enclosed by a diaphragm-type actuator and a check valve is located in the tube adjacent the chamber. When the oil level recedes below the predetermined minimum level, the pressure pulsations in the crankcase are transmitted through the tube and the check valve allows pressure to build up in the chamber to thereby flex the diaphragm. Flexing of the diaphragm operates through a mechanical linkage to operate a switch to stop operation of the engine. However, detecting systems operating on pressure pulsations as disclosed in U.S. Pat. No. 4,203,408, are relatively complex and due to the large number of moving parts, which can stick, wear, or break, do not offer a completely failsafe operation.

SUMMARY OF THE INVENTION

The invention is directed to an improved low level lubricating oil detector for an internal combustion engine. In accordance with the invention the detector includes a tube that extends downwardly into the crankcase of the engine and the inner end of the tube is provided with an opening which is located at the predetermined minimum oil level. The outer end of the tube communicates with a chamber that is located on the outside of the engine and one side of the chamber is enclosed by a pressure transducer, such as a piezo electric element.

When the oil level in the crankcase recedes beneath the minimum level, the pressure pulsations in the crankcase are transmitted through the tube to the piezo electric element which generates an electrical signal that operates through a suitable electrical circuit to either stop operation of the engine, or to operate an alarm.

The invention provides a simple, non-mechanical, low cost detector, which is self-powered and has a reduced likelihood of failure.

The detector has a minimum instrusion into the crankcase of the engine and is readily adaptable to a broad range of small internal combustion engines.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
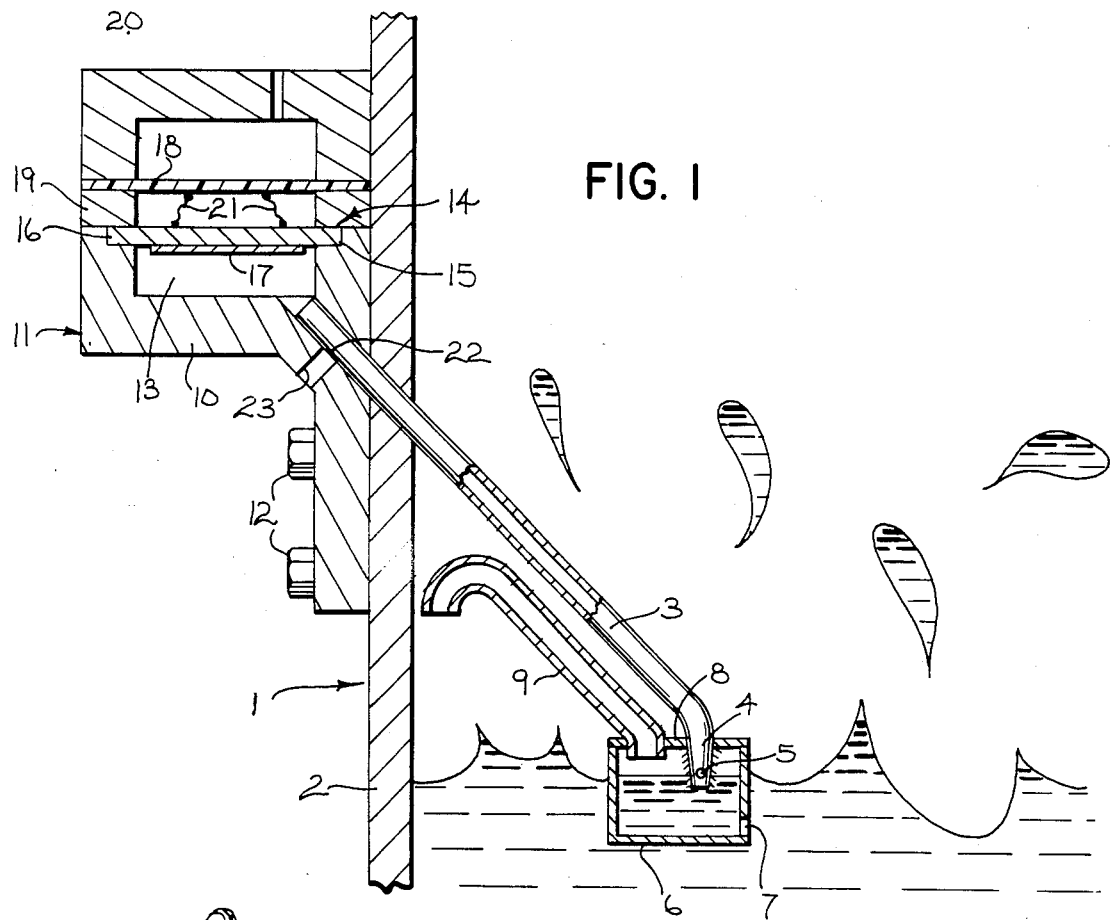
FIG. 1 is a fragmentary vertical section of the crankcase of an internal combustion engine incorporating the low level lubricating oil detector of the invention.
Figure 2:
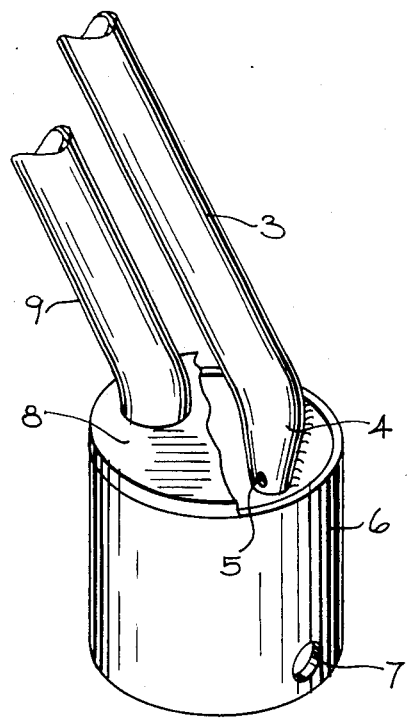
FIG. 2 is a section taken along line 2—2 of FIG. 1.

FIG. 1 illustrates a portion of a typical small internal combustion engine 1, such as a one or two cycle, four stroke engine, having a crank case 2 which acts as a reservoir for lubricating oil. In the conventional small engine a splash lubricating system is utilized in which the connecting rod of the engine carries dippers which, along with the gears, distribute the oil.

In accordance with the invention, the low level oil detector includes a tube 3 which extends downwardly at an angle into the crankcase 2. The lower bent end 4 of tube 3 is closed off and a hole 5 is formed in end 4 and is located at the predetermined minimum oil level. Under normal operating conditions, the oil level will be substantially above the level of hole 5 and when the oil level falls beneath the level of hole 5, the detector of the invention will operate to discontinue operation of the engine as hereinafter described.

The lower end 4 of tube 3 is secured within a closed cup or well 6 and the lower end of cup 6 is provided with one or more small drain holes 7. In operation of the splash lubrication system, a significant portion of the oil is air borne at any given instant and the splashing results in the oil level in the crankcase fluctuating and being ill defined The cup 6 will provide a relatively calm region for measurement of the oil level.

Due to the splashing, oil will tend to collect on tube 3, and if cup 6 has an open top, the oil collected on tube 3 may run down the tube and collect in cup 6, thereby providing an erroneous reading of the oil level in the crankcase. To eliminate this problem, cup 6 has a closed top wall 9 and the lower end of tube 3 is sealed in the top wall. In addition, a vent tube 9 is secured in top wall 8 and extends upwardly from cup 9 and the upper open end of vent tube 8 faces downwardly, as shown in FIG. 1. With this construction, oil cannot flow downwardly along tubes 3 and 9 to enter cup 6, yet the upper interior of cup 6 is exposed to crankcase pressure.

The upper end of tube 3 extends through aligned openings in the wall of crankcase 2 and in the lower section 10 of a housing 11, which is attached to the outer surface of the engine through bolts 12. As shown in FIG. 1, the lower section 10 of housing 11 defines a chamber 13, the upper end of which is enclosed by a pressure transducer 14 which, as illustrated, takes the form of a piezo electric element. Element 14 is supported on an internal shoulder 15 formed in the upper end of housing section 10 and is composed of a thin metal supporting disc 16 having a piezo electric material 17, such as a modified lead zirconium titanate ceramic mounted thereon. Spaced upwardly from the element 14 is a circuit board 18 and the element 14 and circuit board 18 are spaced apart by a spacer ring 19.

Housing 11 also includes an upper section 20 which is secured against the peripheral edge of the circuit board 18. Suitable leads 21 connect the piezo electric material 17 with circuit board 18.

As housing 11 is shown to be located outside crankcase 2, the upper portion of housing 11, above element 14, can either be vented to the atmosphere or sealed. Alternately, if housing 11 is locted in crankcase 2, the upper portion of the housing would be sealed.

A small orifice 22 can be formed in tube 3 and vented to the atmosphere via hole 23 in housing 11. Orifice 22 is of a size small enough so that it will not interfere with normal transmission of pressure pulsations through tube 3, but if a slug of oil should enter tube 3, atmospheric pressure operating through orifice 22 will force the oil slug back into cup 6.

Reciprocating movement of the piston during operation of the engine causes alternate positive and negative pressure pulsations in the crankcase. As long as the end 4 of tube 3 is submerged in oil, the viscosity and inertia of the oil in the tube will substantially prevent the crankcase pressure pulsations from being transmitted to the element 14. However, when the oil level recedes to a level beneath the level of hole 5, essentially all of the pressure pulsations will be transmitted through the tube to the element 14 causing the piezo electric material 17 to flex and generate a signal. The polarity of the material 17 is selected to give an enabling signal on falling pressure, that is when the piston is on the compression stroke. If the voltage is sufficient, a suitable solid state switch will be energized when the primary pulse occurs, grounding the ignition pulse and stopping operation of the engine.

Figure 3:
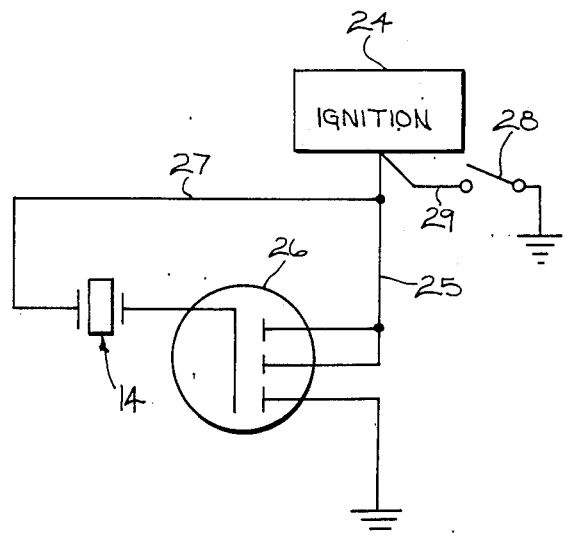
FIG. 3 is a circuit diagram.

A schematic represention of the circuitry is shown in FIG. 3.

The engine ignition, indicated generally by 24, is connected by line 25 through normally open solid state switch 26, illustrated as a power mosfet, to ground, and piezo electric element 14 is connected through line 27 to the switch contacts. A conventional manual ignition shut-off switch 28 is connected in line 29 between the ignition 24 and ground. When pressure pulsations, caused by a low oil level, flex piezoelectric material 17, an electric signal is generated to close switch 26 and ground the ignition.

While the above description has shown the low level oil detector employed to stop operation of the engine, it is contemplated that the detector can also be employed to generate an alarm, such as a visual or audio signal.

The invention provides a simple, low cost, non-mechanical, low level oil detector.

The detector is self powered and has a reduced likelihood of failure, due to the fact that it has no mechanical moving parts.

The detector has a minimum intrusion into the crankcase, as compared with a float operated system, and is easily adaptable to a broad range of small internal combustion engines.

The detector of the invention has particular application for use with engines that run for extended periods of time, such as engines used in generators, compressors, pumps, and the like.

Various modes of carrying out the invention are contemplated as being within the scope of the following claims particulary pointing out and distinctly claiming the subject matter which is regarded as the invention.

I claim:

1. A low level lubricating oil detecting system for an internal combustion engine, comprising an oil reservoir in the engine to contain lubricating oil, a tubular member disposed in said reservoir, the lower end of said tubular member having an aperture disposed at a predetermined minimum oil level and said tubular member having an upper end, a housing defining a chamber, the upper end of said tubular member communicating with said chamber, pressure transducer means enclosing said chamber and being operably connected to said engine, pressure pulsations in said reservoir when the oil level recedes beneath said predetermined minimum level being transmitted through said tubular member and said chamber to flex said pressure transducer means and thereby discontinue operation of said engine.

2. The system of claim 1, wherein said pressure transducer means includes a piezo electric material.

3. The system of claim 1, wherein the lower end of the tubular member is closed and said aperture is disposed in the side wall of the tubular member and spaced from the lower end.

4. A low level lubricating oil detecting system for an internal combustion engine, comprising an oil reservoir in the engine to contain lubricating oil, a container disposed in said reservoir and having a closed upper surface, means disposed in the lower portion of said container for providing communication between said reservoir and the interior of said container whereby oil will be disposed in said container, a tubular member disposed in said reservoir, the lower end of said tubular member extended through the upper surface of said container and having an aperture disposed at a predetermined minimum oil level and said tubular member having an upper end, a housing defining a chamber, a pressure transducer disposed in said chamber and having a surface exposed to the pressure in said reservoir acting through said tubular member, a vent tube having one end communicating with the interior of said container and having a second open end disposed at a level above said oil level and communicating with said reservoir, and electrical circuit means operably connecting said transducer with said engine and arranged to stop operation of said engine on flexing of said transducer due to pressure pulsations in said reservoir when the oil level recedes beneath said predetermined minimum level being transmitted through said tubular member and said chamber.

5. The system of claim 4, wherein said housing is located on the exterior of said reservoir.

6. The system of claim 4, wherein said transducer includes a piezo electric material.

7. The system of claim 5, wherein said transducer has a second surface exposed to the atmosphere.

8. The system of claim 4, wherein said one end of said vent tube is sealed in the upper surface of said container and the second end of said vent tube faces downwardly.

9. The system of claim 4, and including orifice means providing communication between said chamber and the atmosphere.

10. The system of claim 9, wherein said orfice means comprises an orifice disposed in said tubular member, said orifice being sufficiently small to prevent interference with the transmission of said pressure pulsations through said tubular member.

* * * * *